United States Patent
Hsu

(10) Patent No.: US 8,836,674 B2
(45) Date of Patent: Sep. 16, 2014

(54) ACTIVE STYLUS

(75) Inventor: Suei-Shih Hsu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 152 days.

(21) Appl. No.: 13/277,451

(22) Filed: Oct. 20, 2011

(65) Prior Publication Data

US 2012/0218232 A1 Aug. 30, 2012

(30) Foreign Application Priority Data

Feb. 25, 2011 (TW) .............................. 100106513 A

(51) Int. Cl.
*G06F 3/033* (2013.01)

(52) U.S. Cl.
USPC ........................................................ 345/179

(58) Field of Classification Search
USPC ..................... 345/156–184; 178/18.01–20.04
See application file for complete search history.

(56) References Cited

U.S. PATENT DOCUMENTS

| 5,905,359 | A * | 5/1999 | Jimena .......................... | 320/114 |
|---|---|---|---|---|
| 5,975,714 | A * | 11/1999 | Vetorino et al. .............. | 362/192 |
| 6,686,903 | B1 * | 2/2004 | Peng ............................. | 345/163 |
| 2004/0119693 | A1 * | 6/2004 | Kaemmler .................... | 345/163 |
| 2006/0221055 | A1 * | 10/2006 | Chang et al. ................. | 345/163 |
| 2007/0278902 | A1 * | 12/2007 | Rastegar et al. .............. | 310/339 |
| 2008/0218128 | A1 * | 9/2008 | Kim .............................. | 320/137 |
| 2010/0263945 | A1 * | 10/2010 | Mao et al. ................... | 178/19.01 |
| 2012/0319404 | A1 * | 12/2012 | Joseph et al. ................ | 290/50 |
| 2013/0141399 | A1 * | 6/2013 | Cho et al. ..................... | 345/179 |

FOREIGN PATENT DOCUMENTS

| CN | 1801065 A | 7/2006 |
|---|---|---|
| CN | 101893978 A | 11/2010 |
| TW | 201039109 | 11/2010 |

OTHER PUBLICATIONS

Taiwan Patent Office, "Office Action", Oct. 29, 2013.
China Patent Office, "Office Action", Mar. 28, 2014.

* cited by examiner

*Primary Examiner* — Dwayne Bost
*Assistant Examiner* — Ivelisse Martinez Quiles
(74) *Attorney, Agent, or Firm* — Justin King

(57) ABSTRACT

An active stylus includes a tube, a signal emitting module, a power module, an electrical energy storage device, a movable element and an energy transformation module. The signal emitting module, the power module, the electrical energy storage device and the energy transformation module are disposed in the tube. The power module is electrically coupled to the signal emitting module, and the electrical energy storage device and the energy transformation module are electrically coupled to the power module. The movable element is movable in the tube. The energy transformation module is configured for transforming energy generated by motion of the movable element into electrical energy. The electrical energy transformed by the energy transformation module is stored in the electrical energy storage device by the power module.

6 Claims, 1 Drawing Sheet

ACTIVE STYLUS

FIELD OF THE DISCLOSURE

The present disclosure relates to a stylus for a touch panel, and more particularly to an active stylus.

BACKGROUND OF THE DISCLOSURE

With development of science and technology, various human-machine interfaces are wildly applied to electronic apparatuses. Touch panels, which are compact in size, easy to operate and more user friendly than other kinds of human-machine interfaces, are more and more popular. Nowadays, the major types of the touch panels include resistive touch panels, capacitive touch panels, electromagnetic touch panels, and optical touch panels, wherein the electromagnetic touch panels should be used with electromagnetic styluses. The electromagnetic styluses include two types, one type is active electromagnetic styluses, and the other type is non-active electromagnetic styluses. Since the active electromagnetic styluses can emit signal, the corresponding electromagnetic touch panels do not need to emit electromagnetic signals, so as to save power.

FIG. 1 is a schematic view of a typical active electromagnetic stylus. Referring to FIG. 1, the typical active electromagnetic stylus 100 includes a tube 110, an electromagnetic signal emitting module 120, a power module 130 and a battery 140. The electromagnetic signal emitting module 120, the power module 130 and the battery 140 are received in the tube 110. The power module 130 transmits power supplied by the battery 140 to the electromagnetic signal emitting module 120 to enable the electromagnetic signal emitting module 120 to emit electromagnetic signals. A corresponding electromagnetic touch panel (not shown) detects the electromagnetic signals and calculates a coordinate location of the active electromagnetic stylus 100 according to the electromagnetic signals. In such manner, the touch control function of the touch panel can be carried out.

However, when the power of the battery 140 is not enough to supply the electromagnetic signal emitting module 120 to emit signal, the battery 140 need to be replaced. This is inconvenient and not environmental friendly.

SUMMARY OF THE DISCLOSURE

The present disclosure provides an active stylus, which is easily recharged.

An embodiment of the present disclosure provides an active stylus including a tube, a signal emitting module, a power module, an electrical energy storage device, a movable element and an energy transformation module. The signal emitting module, the power module, the electrical energy storage device and the energy transformation module are disposed in the tube. The power module is electrically coupled to the signal emitting module. The electrical energy storage device and the energy transformation module are electrically coupled to the power module. The movable element is movable in the tube. The energy transformation module is configured for transforming energy generated by motion of the movable element into electrical energy. The electrical energy transformed by the energy transformation module is stored in the electrical energy storage device by the power module.

In one embodiment of the present disclosure, the movable element is configured for impacting the energy transformation module, and the energy transformation module is configured for transforming kinetic energy generated by the motion of the movable element into the electrical energy.

In one embodiment of the present disclosure, the electrical energy storage device is a rechargeable battery.

In one embodiment of the present disclosure, the signal emitting module is an electromagnetic signal emitting module.

In one embodiment of the present disclosure, the active stylus further includes a fixed sleeve disposed in the tube, the energy transformation module is fixed in the fixed sleeve, and the movable element is movably disposed in the fixed sleeve.

An embodiment of the present disclosure further provides an active stylus including a tube, a signal emitting module, a power module, an electrical energy storage device and an energy transformation module. The signal emitting module, the power module, the electrical energy storage device and the energy transformation module are disposed in the tube. The power module is electrically coupled to the signal emitting module. The electrical energy storage device and the energy transformation module are electrically coupled to the power module. The electrical energy storage device is movable in the tube. The energy transformation module is configured for transforming energy generated by motion of the electrical energy storage device into electrical energy. The electrical energy transformed by the energy transformation module is stored in the electrical energy storage device by the power module.

In one embodiment of the present disclosure, the movable element is configured for impacting the energy transformation module, and the energy transformation module is configured for transforming the kinetic energy generated by the motion of the movable element into electrical energy.

In one embodiment of the present disclosure, the electrical energy storage device is a rechargeable battery.

In one embodiment of the present disclosure, the signal emitting module is an electromagnetic signal emitting module.

The active stylus of the present disclosure applies the energy transformation module to transform other kinds of energy into the electrical energy, and the power module transmits the electrical energy to be stored in the electrical energy storage device. Thus, the active stylus of the present disclosure is easily recharged.

BRIEF DESCRIPTION OF THE DRAWINGS

The above objects and advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
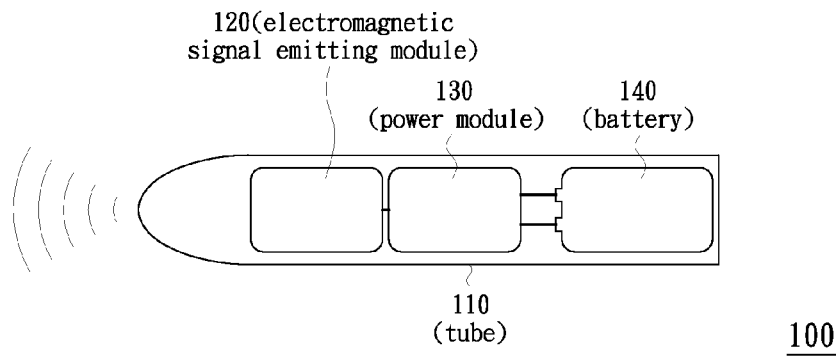
FIG. 1 is a schematic view of a typical active electromagnetic stylus.
Figure 2:
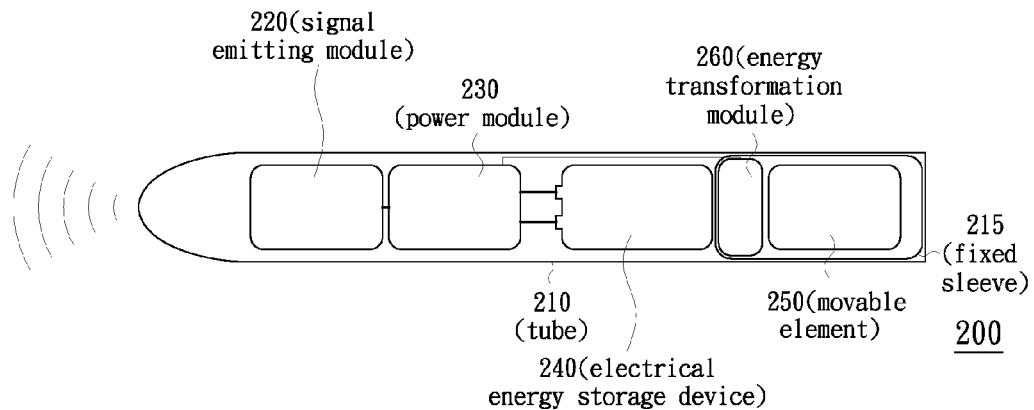
FIG. 2 is a schematic view of an active stylus in accordance with an embodiment of the present disclosure.

FIG. 2 is a schematic view of an active stylus in accordance with an embodiment of the present disclosure. Referring to FIG. 2, the active stylus 200 includes a tube 210, a signal emitting module 220, a power module 230, an electrical energy storage device 240, a movable element 250 and an energy transformation module 260. The signal emitting module 220, the power module 230, the electrical energy storage device 240 and the energy transformation module 260 are disposed in the tube 210. The power module 230 is electrically coupled to the signal emitting module 220. The electrical energy storage device 240 and the energy transformation module 260 are electrically coupled to the power module 230. The movable element 250 is movable in the tube 210. The energy transformation module 260 is configured for transforming kinetic energy or energy generated by motion of the movable element 250 into electrical energy, and the electrical energy transformed by the energy transformation module 260 is stored in the electrical energy storage device 240 by the power module 240.

In this embodiment, the energy transformation module 260 may be a kinetic energy to electrical energy transformation module. The movable element 250 is configured for impacting the energy transformation module 260, and the energy transformation module 260 is configured for transforming the kinetic energy of the motion of the movable element 250 into the electrical energy. The active stylus 200 may further include a fixed sleeve 215 to receive the movable element 250 and the energy transformation module 260. The fixed sleeve 215 is fixed in the tube 210, and the energy transformation module 260 is fixed at one end of the fixed tube 210.

When the tube 210 is shaken, the movable element 250 moves to impact the energy transformation module 260. The energy transformation module 260 transforms the kinetic energy of the movable element 250 into the electrical energy. The power module 230 transmits the electrical energy to be stored in the electrical energy storage device 240. The electrical energy storage device 240 may be, but not limited to, a rechargeable battery.

When the active stylus 200 is operated on a corresponding touch panel (not shown), the power module 230 transmits the electrical energy in the electrical energy storage device 240 to the signal emitting module 220 to enable the signal emitting module 220 to emit signals. The touch panel detects the signals and calculates the coordinate location of the active stylus 200 according to the signals, so as to carry out the touch-control function. That is to say, the power module 230 not only can transmit the electrical energy transformed by the energy transformation module 260 to be stored in the electrical energy storage device 240, but also can transmit the electrical energy in the electrical energy storage device 240 to the signal emitting module 220. In this embodiment, the signal emitting module 220 may be, but not limit to, an electromagnetic signal emitting module 220, and the touch panel may be an electromagnetic touch panel.

In this embodiment, since the energy transformation module 260 can transform the kinetic energy of the movable element 250 into the electrical energy and the electrical energy is stored in the electrical energy storage device 240 by the power module 230, the active stylus 200 is easily recharged. Thus, it does not need to frequently replace the electrical energy storage device 240, so the active stylus 200 of this embodiment is environmental friendly.

It should be noted that, although the above embodiment takes the energy transformation module 260 being the kinetic energy to electrical energy transformation module for example, the kind of energy transformation module of the present disclosure is not limited to this. One design concept of the present disclosure is that the energy transformation module is applied to transform other kinds of energy into the electrical energy. In other embodiments, the energy transformation module 260 may be replaced by other kinds of energy transformation module, such as a magnetic energy to electrical energy transformation module which is used with a coil. In addition, although the active stylus 200 includes the fixed sleeve 215 in above embodiment, in another embodiment, the fixed sleeve 215 may be omitted and the energy transformation module 260 is directly fixed in the tube 210.

Figure 3:
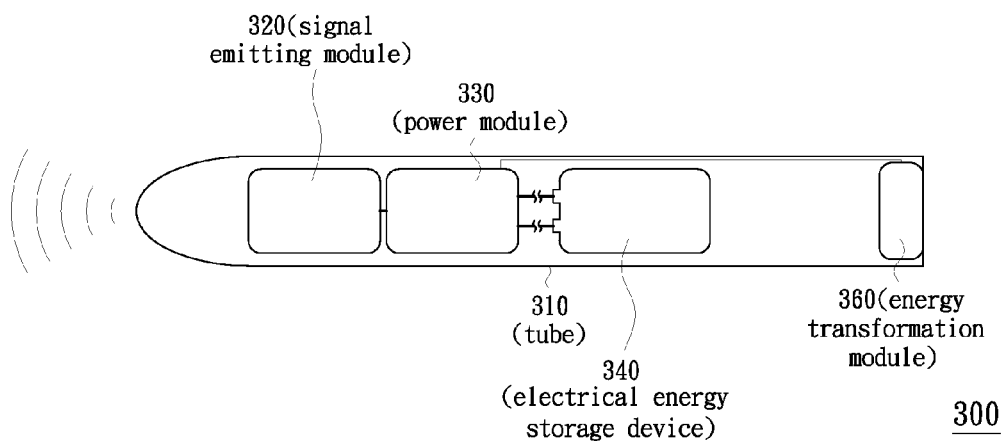
FIG. 3 is a schematic view of another active stylus in accordance with another embodiment of the present disclosure.

FIG. 3 is a schematic view of another active stylus in accordance with another embodiment of the present disclosure. Referring to FIG. 3, the active stylus 300 includes a tube 310, a signal emitting module 320, a power module 330, an electrical energy storage device 340 and an energy transformation module 360.

The configuration and advantages of the active stylus 300 of this embodiment are similar to that of the active stylus 200 of the above embodiment. Only the differences of the configuration between the active stylus 300 and the active stylus 200 are described below. Compared to the active stylus 200, the movable element is omitted in the active stylus 300, and the electrical energy storage device 340 is movably disposed in the tube 310. The signal emitting module 320 and the power module 330 of this embodiment are similar to the signal emitting module 220 and the power module 230 of the active stylus 200. In this embodiment, the energy transformation module 360 is configured for transforming kinetic energy generate by the motion of the electrical energy storage device 340 into electrical energy, and the electrical energy transformed by the energy transformation module 360 is stored in the electrical energy storage device 340 by the power module 330.

When the tube 310 is shaken, the electrical energy storage device 340 moves to impact the energy transformation module 360, and the energy transformation module 360 transforms the kinetic energy of the electrical energy storage device 340 into the electrical energy. The electrical energy transformed by the energy transformation module 360 is stored in the electrical energy storage device 340 by the power module 330.

In summary, in the present disclosure, since the energy transformation module can transform other kinds of energy into the electrical energy and the power module can transmits the electrical energy to be stored in the electrical energy storage device, the active stylus of the present disclosure is easily recharged. Thus, it does not need to frequently replace the electrical energy storage device, so the active stylus of the present disclosure is environmental friendly.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An active stylus, comprising:
   a tube;
   a signal emitting module disposed in the tube;
   a power module disposed in the tube and electrically coupled to the signal emitting module;
   an electrical energy storage device disposed in the tube and electrically coupled to the power module;
   a movable element movably disposed in the tube;

an energy transformation module disposed in the tube and electrically coupled to the power module, wherein the movable element is configured for directly impacting the energy transformation module, and the energy transformation module is configured for directly transforming kinetic energy generated by the motion of the movable element into electrical energy, the electrical energy is not produced by electromagnetic induction, and the electrical energy transformed by the energy transformation module being stored in the electrical energy storage device by the power module; and a fixed sleeve disposed in the tube, wherein the energy transformation module is fixed in the fixed sleeve, and the movable element is movably disposed in the fixed sleeve.

2. The active stylus according to claim 1, wherein the electrical energy storage device is a rechargeable battery.

3. The active stylus according to claim 1, wherein the signal emitting module is an electromagnetic signal emitting module.

4. An active stylus, comprising:
a tube;
a signal emitting module disposed in the tube;
a power module disposed in the tube and electrically coupled to the signal emitting module;
an electrical energy storage device movably disposed in the tube and electrically coupled to the power module; and
an energy transformation module disposed in the tube and electrically coupled to the power module, wherein the electrical energy storage device is adapted to move forward and back in a straight path to directly impact the energy transformation module, the energy transformation module is configured for transforming energy generated by motion of the electrical energy storage device into electrical energy, the electrical energy is not produced by electromagnetic induction, and the electrical energy transformed by the energy transformation module is stored in the electrical energy storage device by the power module,
wherein the signal emitting module, the power module and the energy transformation module are fixed in the tube.

5. The active stylus according to claim 4, wherein the electrical energy storage device is a rechargeable battery.

6. The active stylus according to claim 4, wherein the signal emitting module is an electromagnetic signal emitting module.

* * * * *